Figure 1:
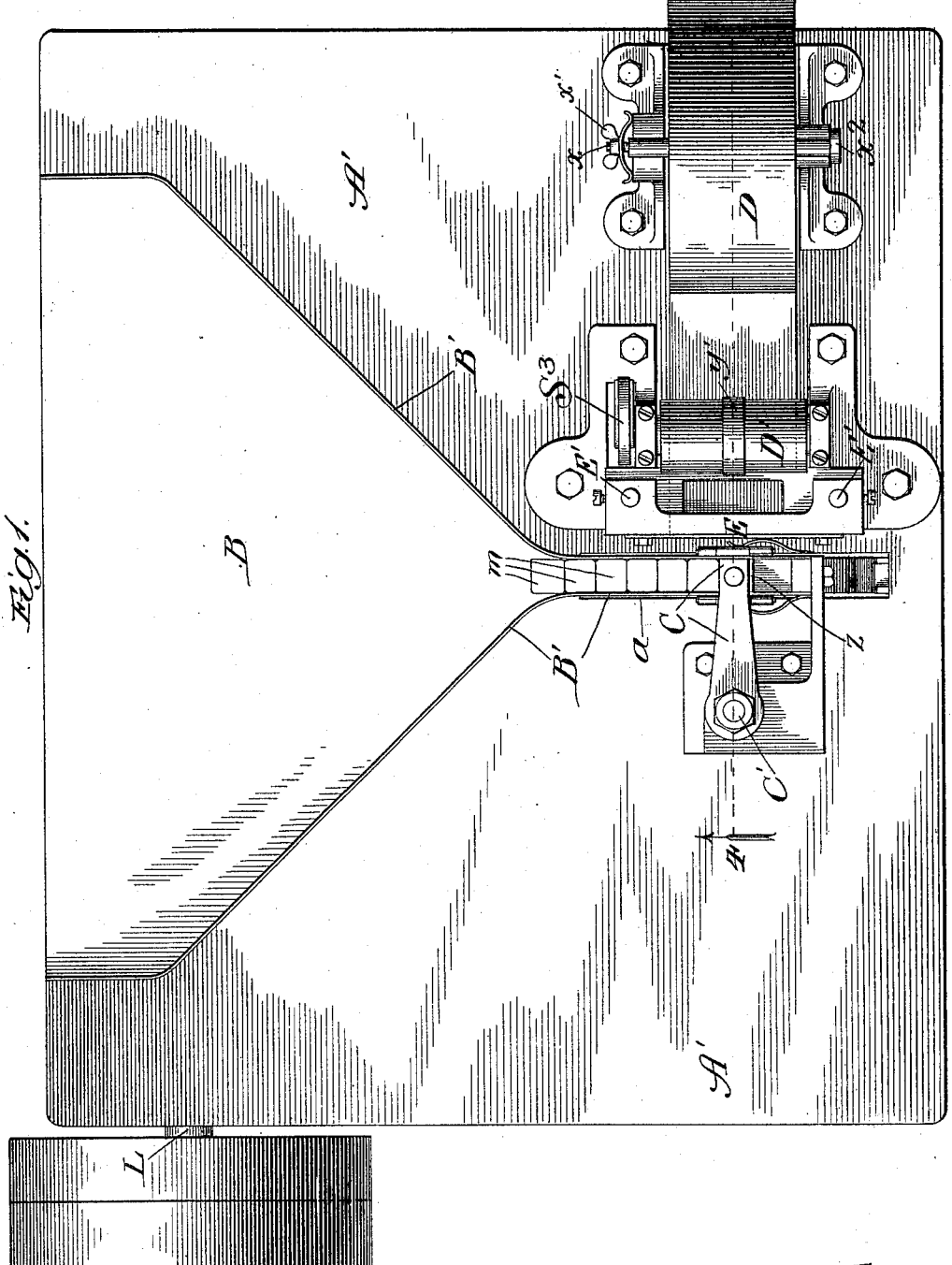

No. 719,410. PATENTED JAN. 27, 1903.
S. J. HICKS.
WRAPPING MACHINE.
APPLICATION FILED DEC. 1, 1900.
NO MODEL. 13 SHEETS—SHEET 1.

Witnesses:
Inventor:
Simeon J. Hicks,

No. 719,410. PATENTED JAN. 27, 1903.
S. J. HICKS.
WRAPPING MACHINE.
APPLICATION FILED DEC. 1, 1900.
NO MODEL. 13 SHEETS—SHEET 7.

Witnesses:
Inventor:
Simeon J. Hicks,

No. 719,410. PATENTED JAN. 27, 1903.
S. J. HICKS.
WRAPPING MACHINE.
APPLICATION FILED DEC. 1, 1900.
NO MODEL. 13 SHEETS—SHEET 8.
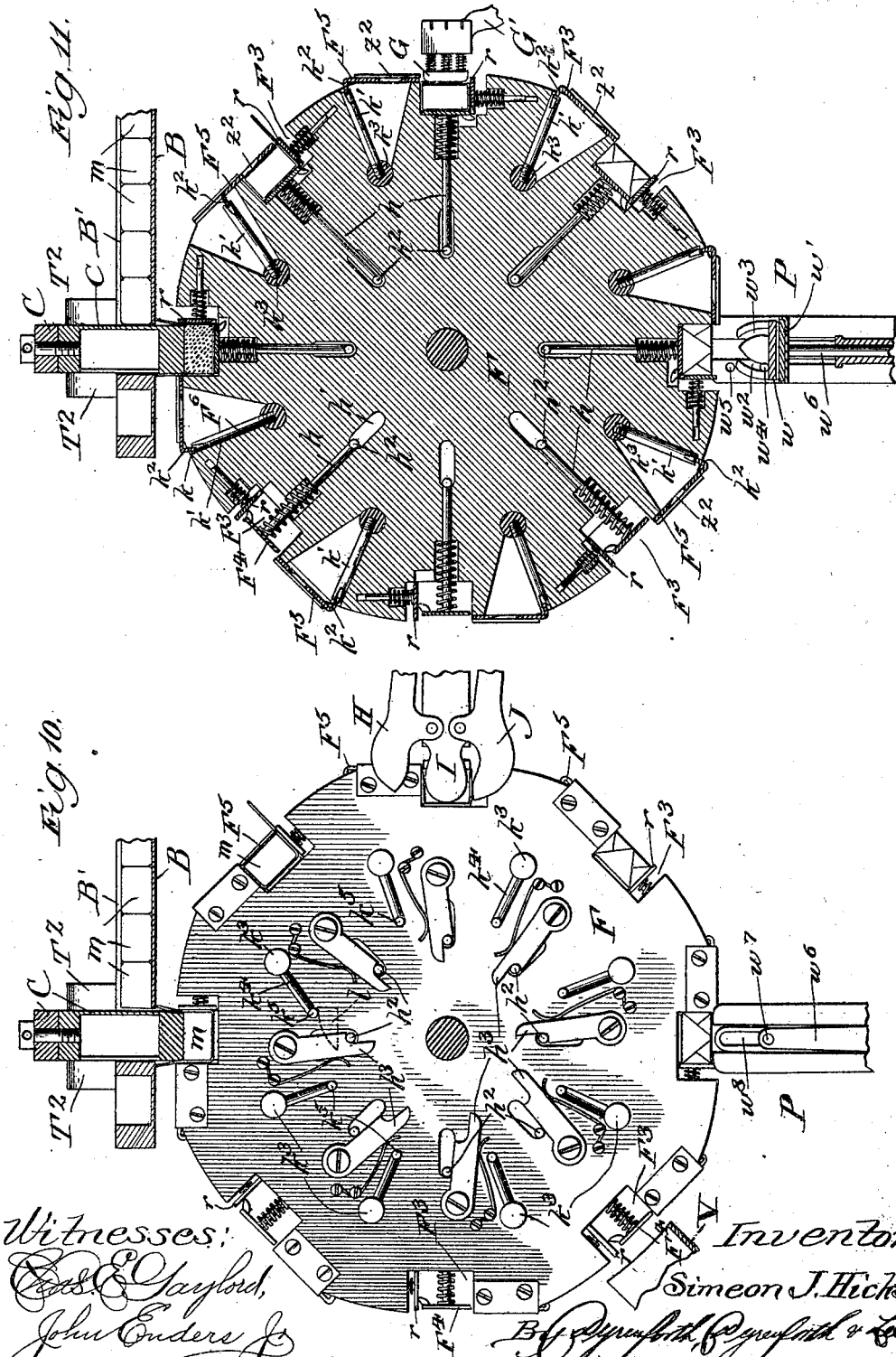

No. 719,410. PATENTED JAN. 27, 1903.
S. J. HICKS.
WRAPPING MACHINE.
APPLICATION FILED DEC. 1, 1900.
NO MODEL. 13 SHEETS—SHEET 9.
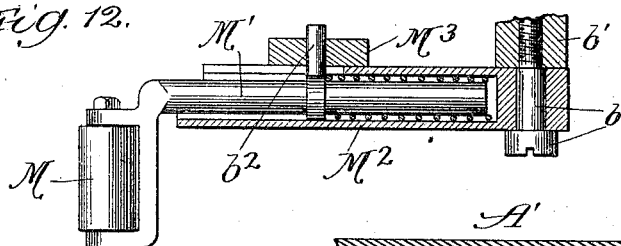
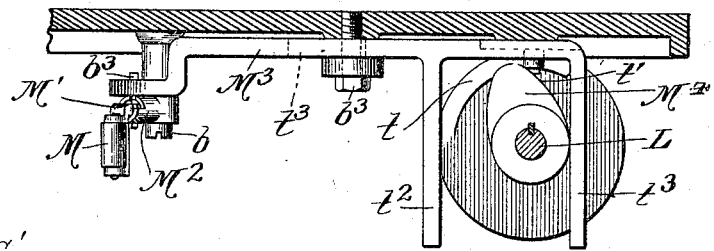
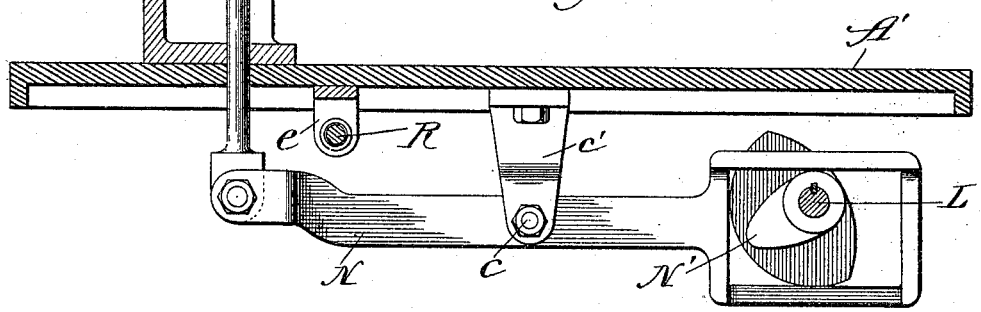
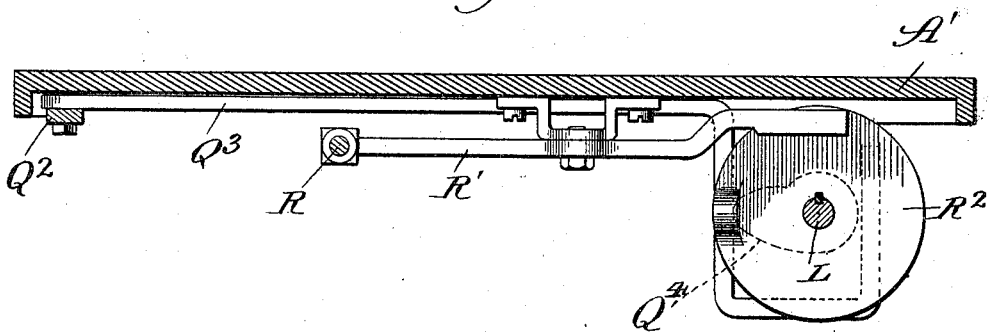

No. 719,410. PATENTED JAN. 27, 1903.
S. J. HICKS.
WRAPPING MACHINE.
APPLICATION FILED DEC. 1, 1900.
NO MODEL. 13 SHEETS—SHEET 10.

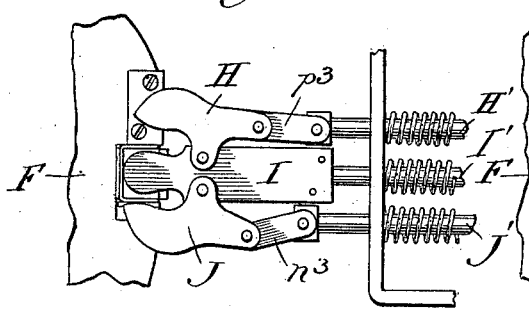
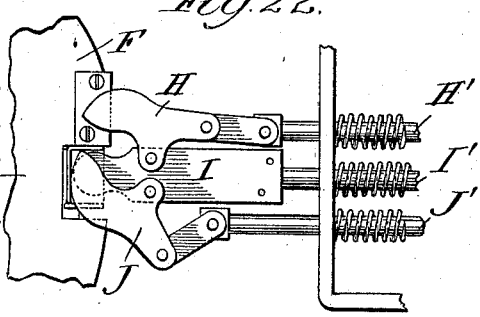
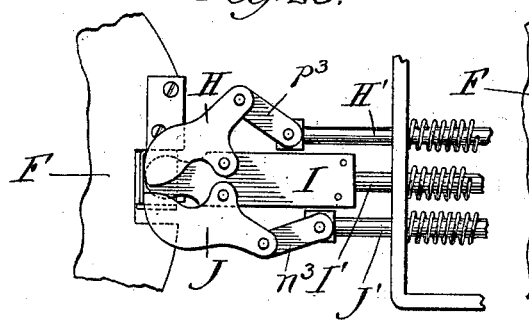
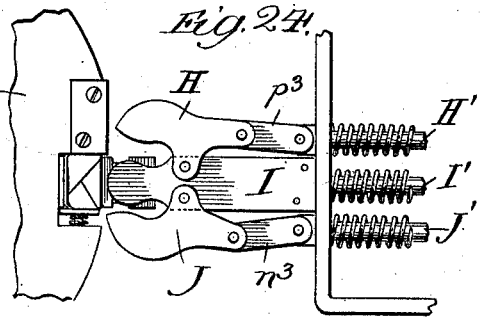
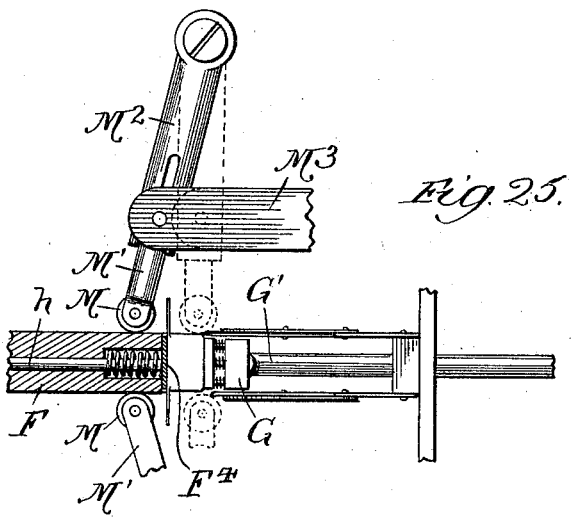

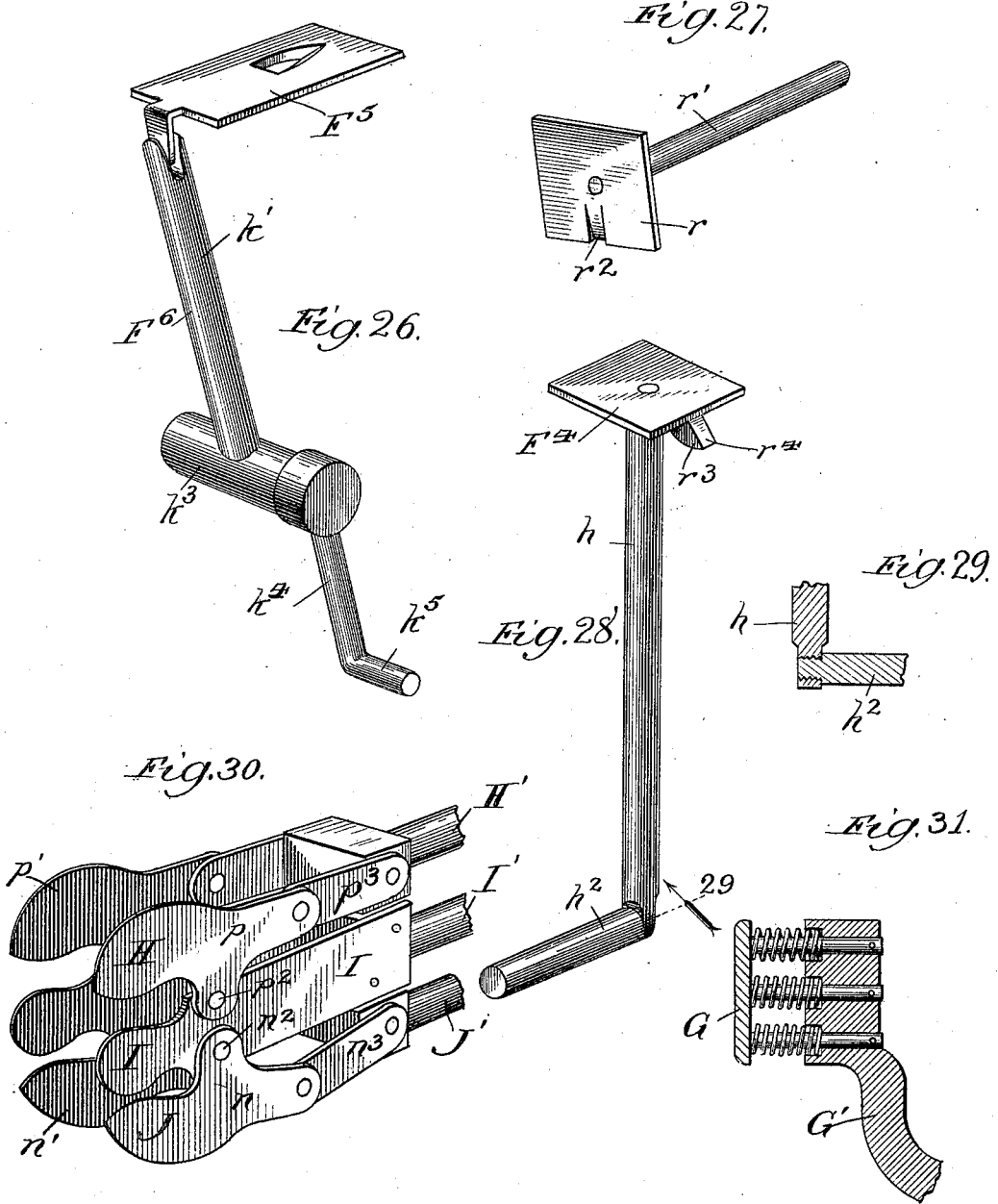

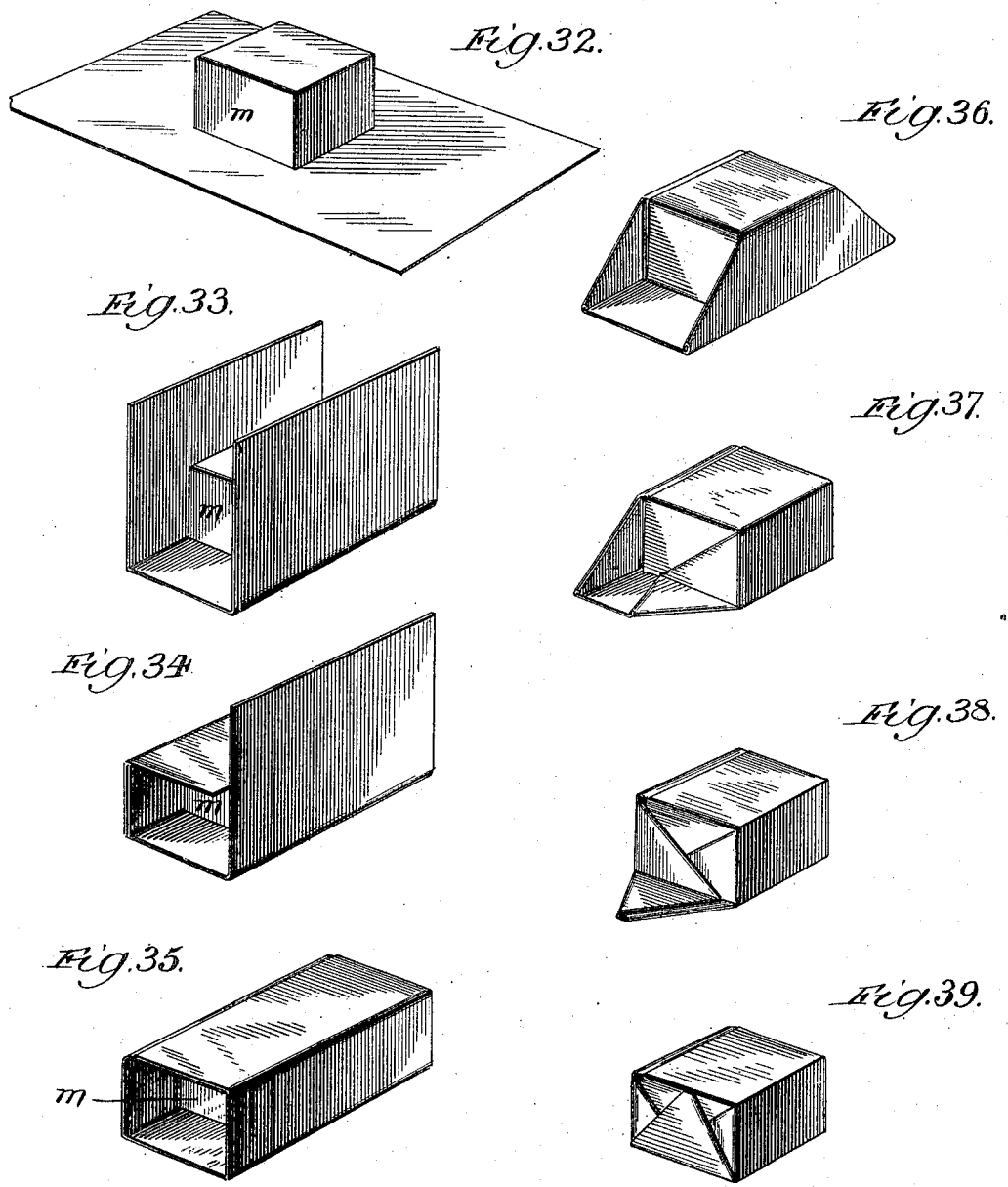

UNITED STATES PATENT OFFICE.

SIMEON J. HICKS, OF CHICAGO, ILLINOIS, ASSIGNOR TO CORDELIA S. HICKS, OF CHICAGO, ILLINOIS.

WRAPPING-MACHINE.

SPECIFICATION forming part of Letters Patent No. 719,410, dated January 27, 1903.

Application filed December 1, 1900. Serial No. 38,297. (No model.)

*To all whom it may concern:*

Be it known that I, SIMEON J. HICKS, a citizen of the United States, residing at Chicago, in the county of Cook and State of Illinois, have invented a new and useful Improvement in Wrapping-Machines, of which the following is a specification.

My invention relates particularly to machines for wrapping caramels or other confectionery; and my object is to provide a machine capable of rapidly performing work of this nature as well or as better than the same can be performed by hand.

In the preferred construction the machine is supplied with an intermittently-actuated disk-like stock-wheel having peripheral pockets for receiving the caramels, ejectors in said pockets for effecting a discharge of the caramels at the proper place, and suitable mechanism for effecting one fold of the paper, a plunger coacting with said wheel which serves to depress the caramels in succession into said pockets, thereby effecting two folds of the paper, and mechanism outside of but coacting with the stock-wheel for effecting the remaining folds of the paper.

An understanding of the construction and operation of the machine will be facilitated by a reference at this time to Figures 32 to 39 of the drawings, illustrating the various foldings to which the paper is subjected. Taking these figures in their order, the first shows the caramel resting upon the paper; the second, the paper folded up across the advance and rear vertical faces or edges of the caramel; the third, the rear margin of the paper folded over the top of the caramel; the fourth, the front margin of the paper folded over the top of the caramel; the fifth, the upper projecting end portions of the paper folded downwardly over the lateral edges of the caramel; the sixth, the front projecting end portions of the paper folded rearwardly upon the lateral edges of the caramel; the seventh, the rear projecting end portions of the paper folded forwardly over the lateral edges of the caramel, and the eighth the lower projecting end portions of the paper folded upwardly on the lateral edges of the caramel. In the preferred construction the plunger in depressing the caramel into the peripheral pocket of the wheel makes the two folds illustrated in Fig. 33. A tangentially-placed folder-plate, which is given an advance movement over the movement of the stock-wheel, makes the additional fold illustrated in Fig. 34. A local spring-held presser-plate, beneath which the caramel is carried, makes the additional fold illustrated in Fig. 35. Two simultaneously-extended folders press the paper toward the axis of the wheel, thereby making the folds upon the lateral edges of the caramel which are illustrated in Fig. 36. Two simultaneously-moving folders having a certain swinging movement make the additional folds illustrated in Fig. 37. Two simultaneously-moving folders of similar action make the additional folds illustrated in Fig. 38, and two simultaneously-actuated rollers make the final folds illustrated in Fig. 39.

Figure 2:
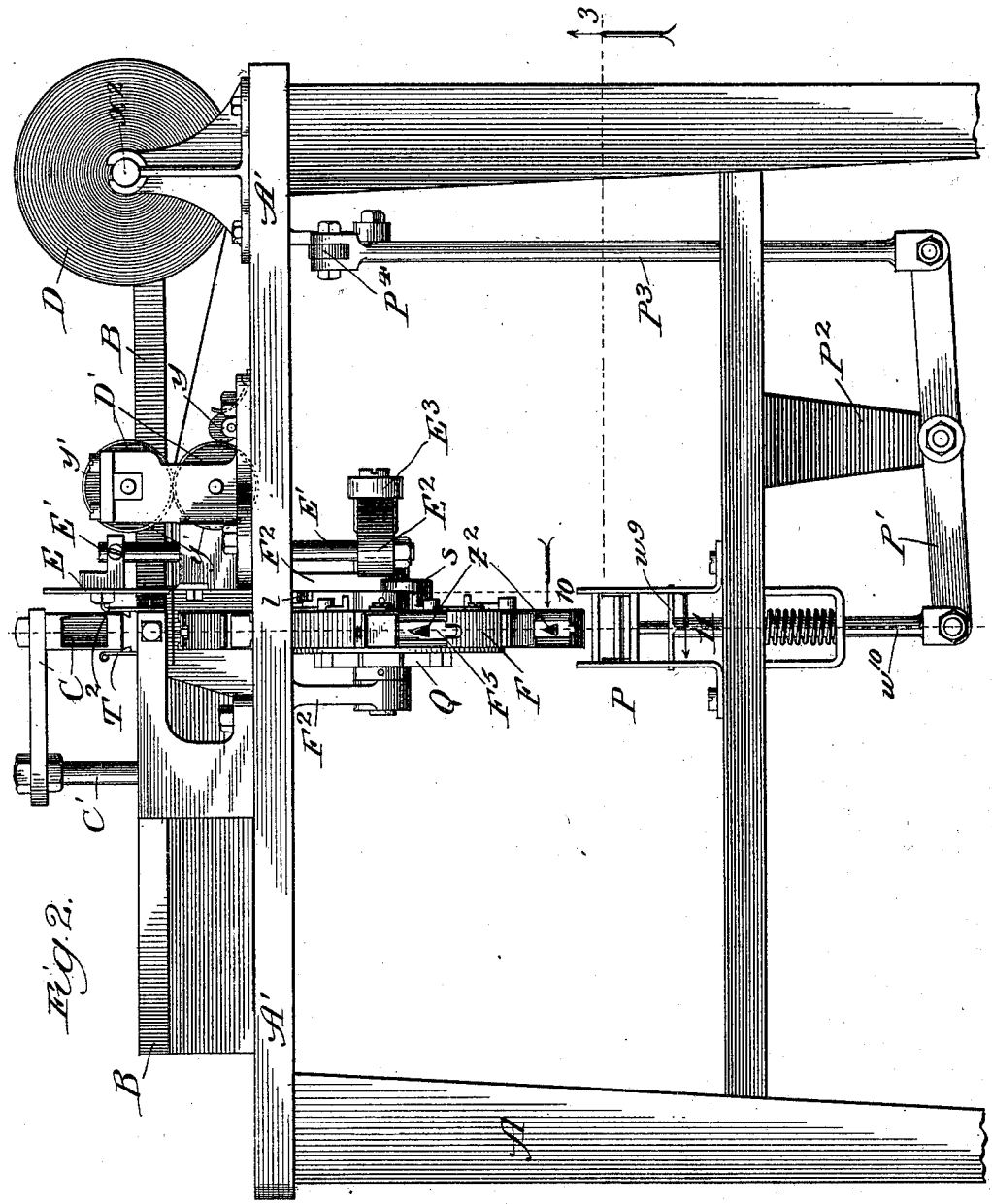
Figure 3:
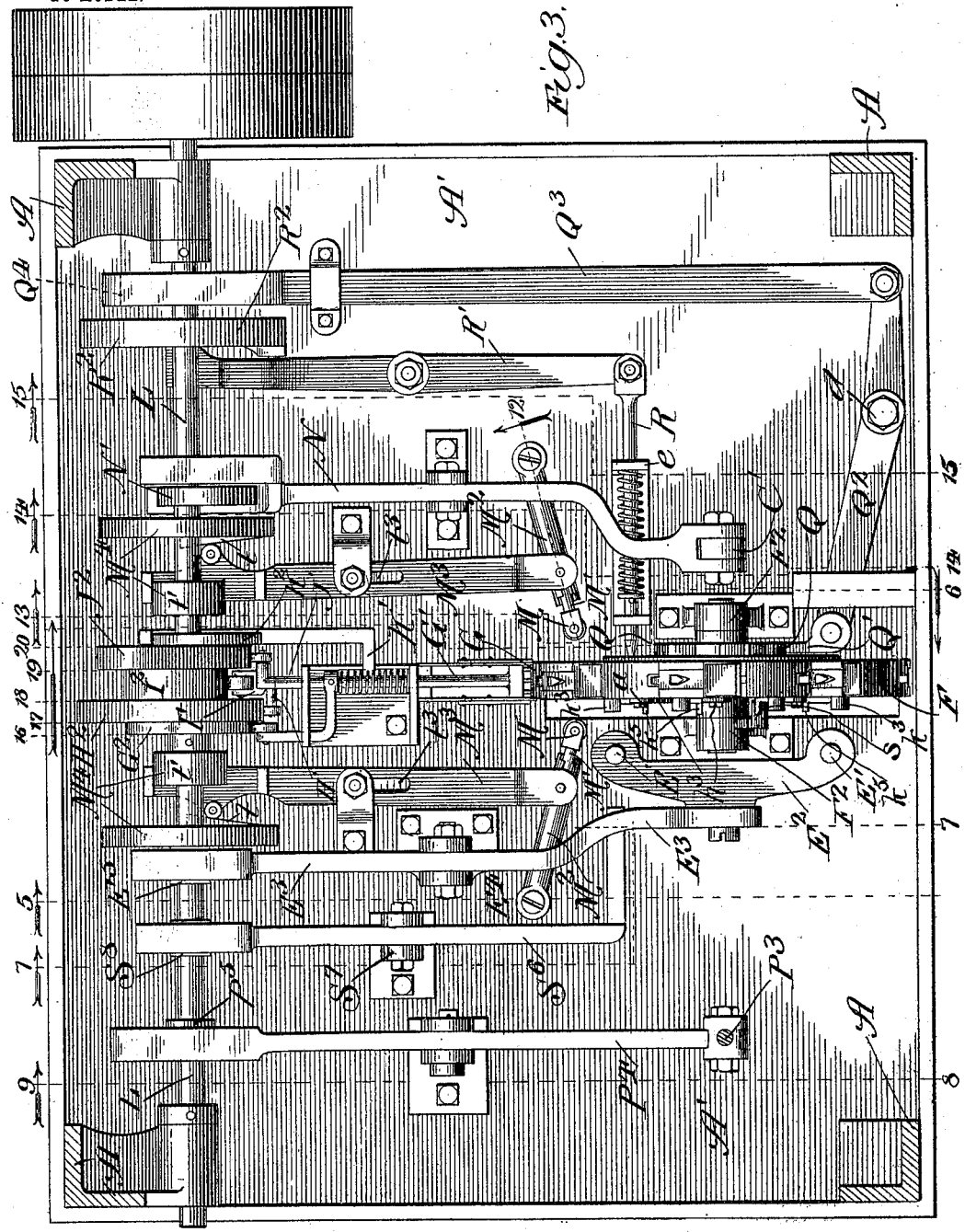
Figure 4:
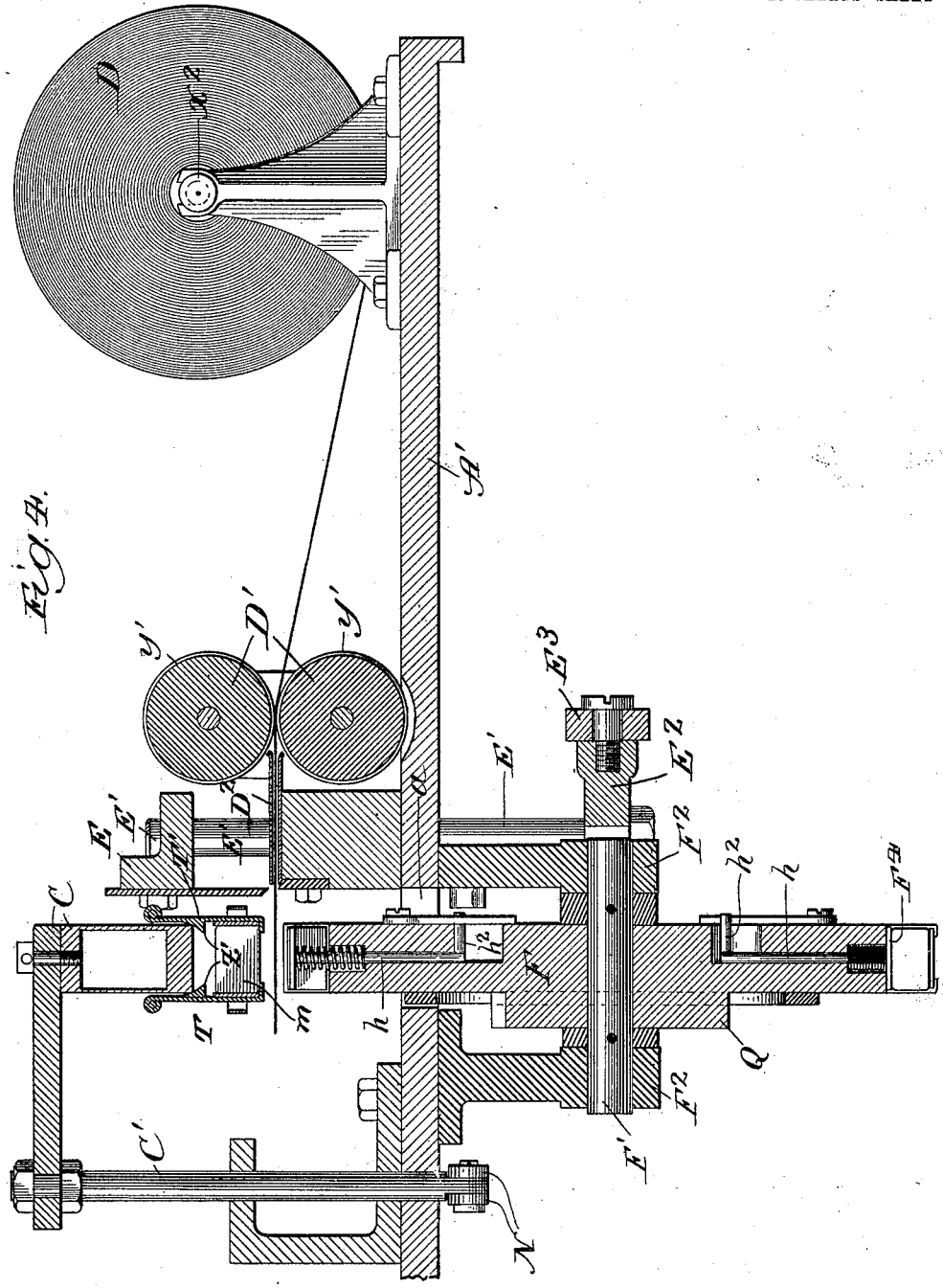
Figure 5:
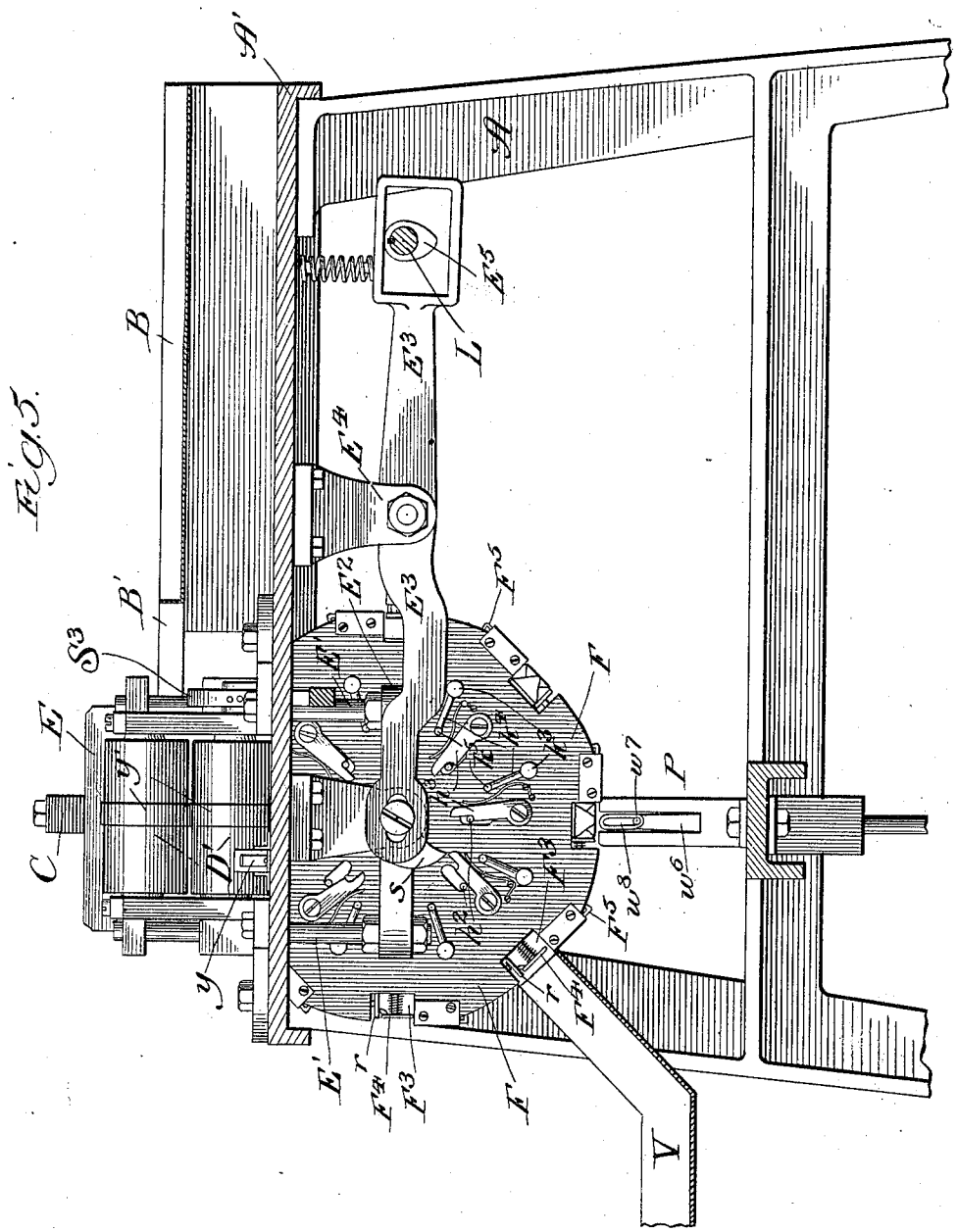
Figure 6:
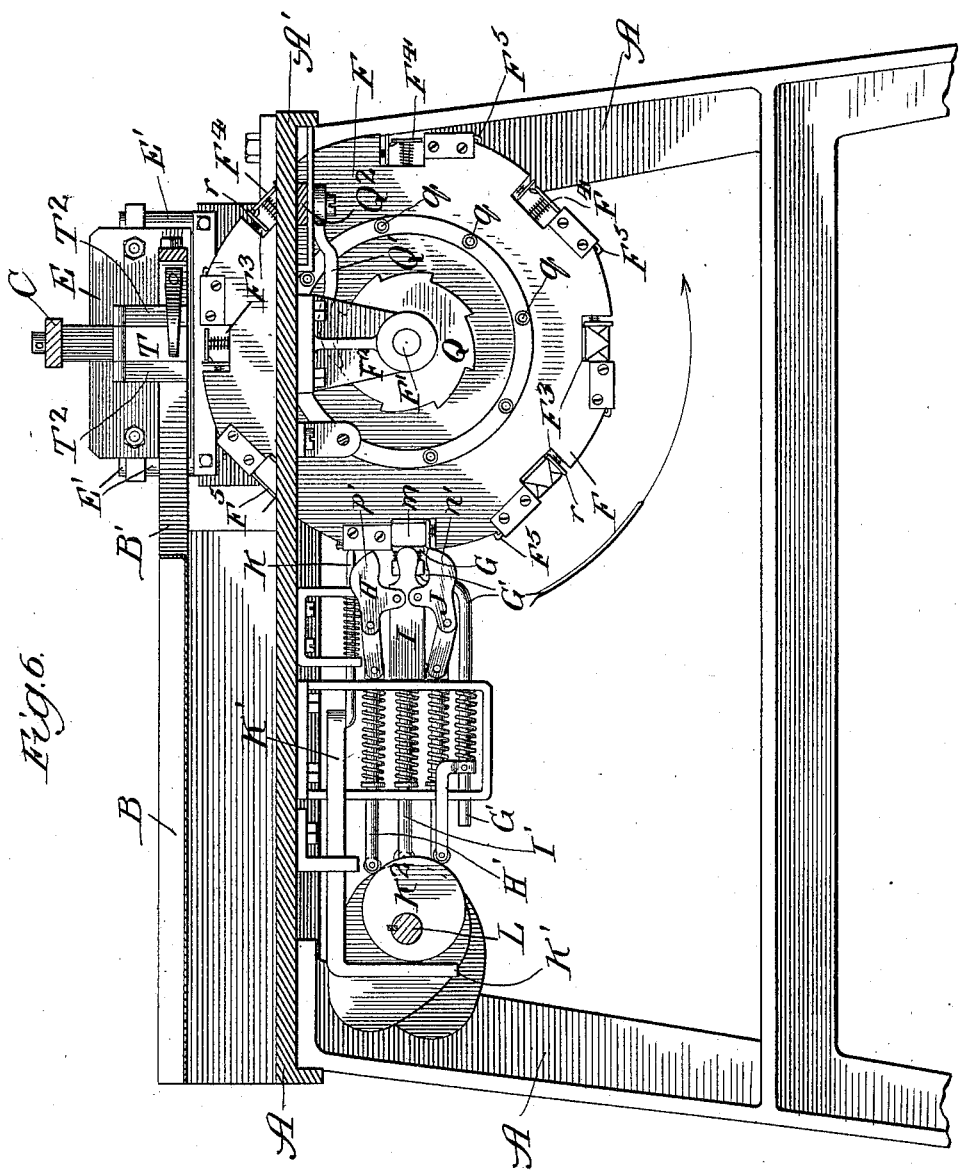
Figure 7:
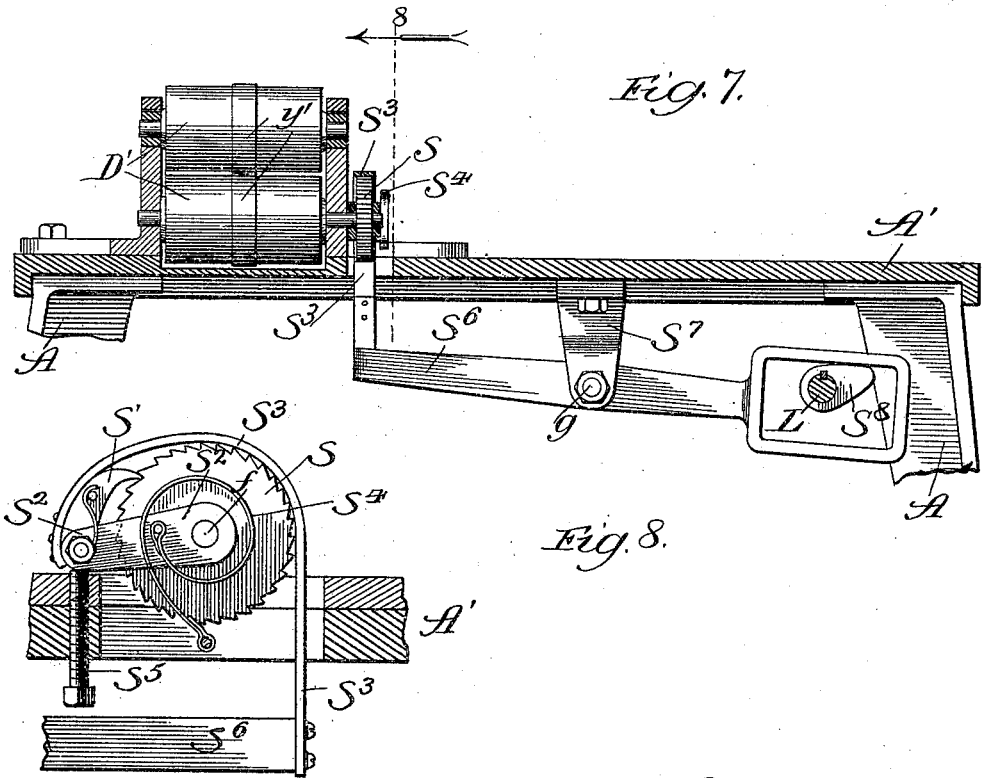
Figure 8:
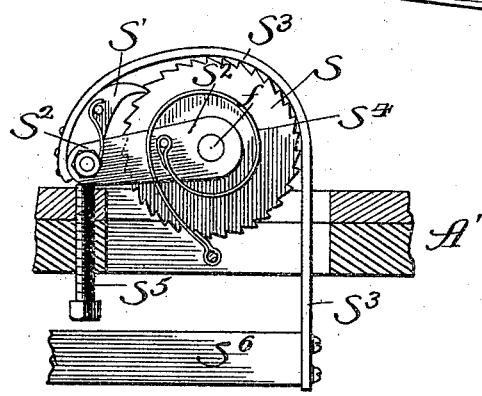
Figure 9:
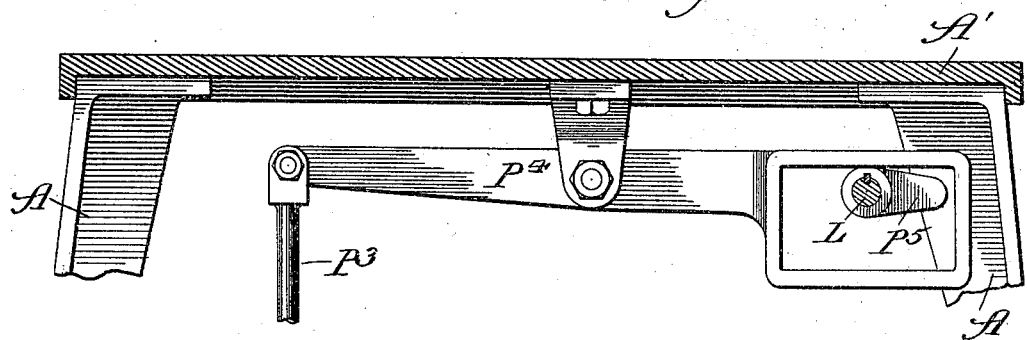
Figure 16:
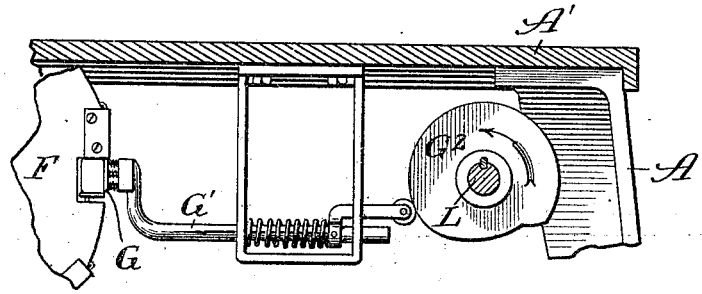
Figure 17:
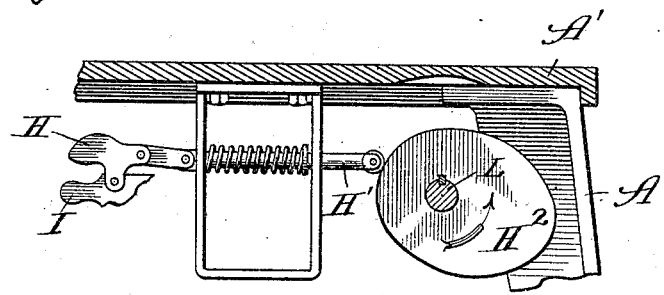
Figure 18:
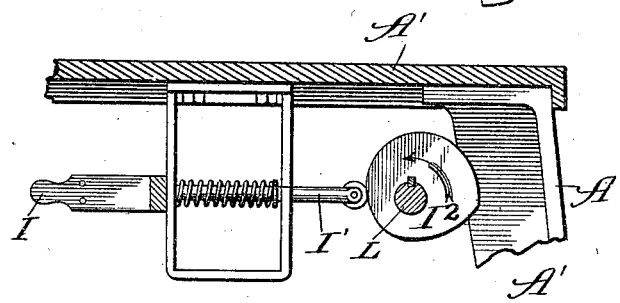
Figure 19:
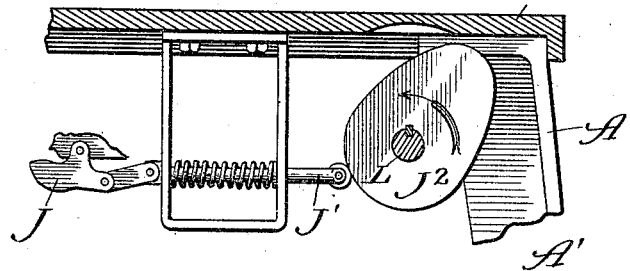
Figure 20:
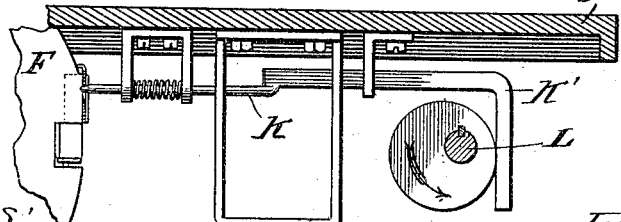

In the drawings, Figure 1 represents a plan view of a caramel-wrapping machine embodying my improvements; Fig. 2, a view of the machine in rear end elevation, certain portions of the mechanism being omitted; Fig. 3, a bottom plan section taken as indicated at line 3 of Fig. 2; Fig. 4, an enlarged broken transverse section taken as indicated at line 4 of Fig. 1; Fig. 5, a vertical longitudinal section taken as indicated at line 5 of Fig. 3 and showing the stock-wheel employed and the cam which operates the paper-cutter; Fig. 6, a vertical longitudinal section taken as indicated at line 6 of Fig. 3 and showing prominently a cam for actuating a pointed plunger, which serves to retract the peripherally-placed folder-plates above-referred to; Fig. 7, a longitudinal section taken as indicated in line 7 of Fig. 3; Fig. 8, an enlarged broken sectional view taken as indicated at line 8 of Fig. 7 and illustrating a portion of the paper-feed mechanism; Fig. 9, a longitudinal section taken as indicated at line 9 of Fig. 3. Fig. 10 a broken section taken as indicated at line 10 of Fig. 2 and illustrating one side of the stock-wheel; Fig. 11, a vertical section taken as indicated at line 11 of Fig. 2 and illustrating the mechanism carried by the stock-wheel; Fig. 12, a broken substantially transverse section taken as indicated at line 12 of Fig. 3 and illustrating one of the folder-rollers employed; Fig. 13, a broken longitudinal section taken as indicated at line 13 of Fig. 3 and illustrating a cam which operates one of said folder-rollers; Fig. 14, a longitudinal section taken as indicated at line 14 of Fig. 3 and illustrating a cam which operates the plunger by means of which the caramels are forced into the peripheral pockets of the stock-wheel; Fig. 15, a longitudinal section taken as indicated at line 15 of Fig. 3 and illustrating in full lines a cam for actuating a lock for the stock-wheel and in dotted lines a cam for actuating the stock-wheel-actuating device; Fig. 16, a broken longitudinal section taken as indicated at line 16 of Fig. 3 and illustrating the cam for actuating the spring-held presser-plate above referred to; Fig. 17, a similar section taken as indicated at line 17 of Fig. 3 and illustrating a cam for actuating one set of the swinging folders referred to; Fig. 18, a similar section taken as indicated at line 18 of Fig. 3 and illustrating a cam for actuating the folders which make the folds illustrated in Fig. 36; Fig. 19, a section taken as indicated at line 19 of Fig. 3 and illustrating a cam which actuates the other set of swinging folders; Fig. 20, a section taken as indicated at line 20 of Fig. 3 and illustrating the cam which actuates the device for retracting the tangentially-placed folder-plates referred to; Fig. 21, a broken view illustrating in side elevation the folders which effect the foldings illustrated in Figs. 36, 37, and 38 and showing the position of said folders at the time that the folds illustrated in Fig. 36 are produced; Fig. 22, a view of said folders, showing the position thereof at the time the folds illustrated in Fig. 37 are made; Fig. 23, a similar view showing the position when the folds illustrated in Fig. 38 are made; Fig. 24, a view showing said folders all retracted; Fig. 25, a broken sectional view illustrating in full lines the position of the folder-rollers which produce the final folds just prior to the production of said folds and in dotted lines the position of said folder-rollers after the final folds are produced; Fig. 26, a view in perspective of one of the peripherally-placed folder-plates and the device for extending or advancing it; Fig. 27, a view in perspective of a spring-held plate with which the advance vertical surfaces of the peripheral pockets of the wheel are equipped; Fig. 28, a spring-held ejector with which said pockets are equipped; Fig. 29, a broken sectional view taken as indicated at line 29 of Fig. 28; Fig. 30, a broken perspective view of the folders which make the folds, illustrated in Figs. 36 to 38, inclusive; Fig. 31, a broken sectional view showing the local spring-held presser-plate above referred to; and Figs. 32 to 39, inclusive, views illustrating the succession in which the various foldings of the paper occur.

A represents the frame of the machine; A', the top or table thereof; B, a horizontally-disposed hopper or pan supported above said table and ending at its rear portion in a feed-chute B'; C, a plunger, which serves to depress the caramels into the peripheral recesses provided therefor in the stock-wheel; C', a reciprocating bolt or rod by means of which said plunger is operated; D, a paper-roll from which the wrapping-paper is supplied; D', feed-rollers between which said paper passes; $D^2$, a stationary guide for the paper; E, a reciprocating knife carried by vertically-movable studs or bolts E'; $E^2$, a head or bar connected with the plunger-rods E'; $E^3$, a cam-actuated lever connected with said head by means of a pin-and-slot connection and pivotally supported on a bracket $E^4$; $E^5$, a cam for actuating the lever $E^3$; F, a stock-wheel located in a vertical longitudinal plane and supported on a shaft F', journaled in bearings $F^2$, depending from the lower side of the frame-top, said wheel projecting through a slot $a$ in said top to receive caramels from the feed-chute B', as illustrated in Fig. 11; $F^3$, peripheral pockets or recesses with which the stock-wheel is provided; $F^4$, spring-held ejectors with which said recesses are provided; $F^5$, tangential folder-plates with which the wheel is equipped and which serve to make the fold illustrated in Fig. 34; $F^6$, rock-levers for advancing said folder-plates; G, Fig. 16, a spring-held local presser-plate carried by a stem G', actuated by a cam $G^2$; H, Figs. 17 and 30, a folding device connected with a stem H' and actuated by a cam $H^2$ and serving to make the folds illustrated in Fig. 38; I, Fig. 18, a folder connected with a stem I' and actuated by a cam $I^2$ and serving to make the folds illustrated in Fig. 36; J, Fig. 19, a folder connected with a stem J' and actuated by a cam $J^2$ and serving to make the folds illustrated in Fig. 37; K, Figs. 6 and 20, a folder-plate-retracting device connected with a stem K' and actuated by a cam $K^2$; L, a shaft upon which said cams are secured and which extends parallel to the front of the machine and is located a short distance beneath the top thereof; M, Figs. 3, 12, 13, and 25, folder-rollers located at opposite sides of the stock-wheel and journaled in stems M', which are movable in spring-equipped sockets in arms $M^2$, which are pivoted by screws $b$ to lugs $b'$ on the under side of the frame-top; $M^3$, cam-actuated bars or levers pivotally connected by studs $b^2$ to the stems M' and having pivotal connection at $b^3$ with the frame-top; $M^4$, cams on the shaft L and serving to actuate the bars $M^3$; N, Fig. 14, a plunger-actuating lever pivotally connected at $c$ to a depending hanger $c'$ on the lower side of the frame-top and actuated by a cam N', secured to the shaft L; P, Figs. 2, 3, and 9, a printing device located beneath the stock-wheel and actuated by a lever P', pivoted on a support $P^2$ and connected by a rod $P^3$ with a cam-actuated lever $P^4$; $P^5$, a cam on the shaft L for actuating the lever $P^4$; Q, Figs. 2, 3, and 6, a ratchet-wheel rigid with the stock-wheel shaft F'; Q', Fig. 2, a pawl engaging said ratchet-wheel; $Q^2$, a lever connected with said pawl and pivotally joined at $d$, Fig. 3, to the lower side of the table-top; $Q^3$, a cam-actuated bar for actuating the lever $Q^2$; $Q^4$, (see dotted lines, Fig. 15,) a cam for actuating the bar $Q^3$; R, Fig. 3, a stock-wheel-locking device movable in a guide $e$ and actuated by a lever R', engaging a cam $R^2$ on the shaft L; S, Figs. 5, 7, and 8, a ratchet-wheel for operating the paper-feed rollers; S', a spring-held pawl engaging said ratchet-wheel and pivotally connected with an arm $S^2$, journaled on the shaft $f$ of the lower feed-roll; $S^3$, a strap, which may be of metal, for operating the pawl S'; $S^4$, a spring which serves to hold the arm $S^2$ normally against an adjustable stop $S^5$; $S^6$, a cam-actuated lever connected with a strap $S^3$ and pivotally joined by a bolt $g$ to a bracket $S^7$ on the lower surface of the frame-top; $S^8$, a cam on the shaft L for actuating the lever $S^6$; T T', Fig. 4, spring-held caramel-supporting plates pivotally connected at their upper ends with pins carried by standards $T^2$, Fig. 6, from the feed-chute B', and V, Fig. 5, a discharge-chute whereat the caramels are discharged after having been properly wrapped and stamped.

The stock-wheel, Figs. 10 and 11, is provided with suitable radial perforations for receiving stems $h$ of the ejectors $F^4$ and with slots $h'$ for receiving the laterally-projecting ends $h^2$ of said stems. Spring-held latches $h^3$ serve to engage said laterally-extending ends and hold the ejector-plates depressed while the caramels are being wrapped. Fig. 4 illustrates the manner in which a caramel is received by the spring-held jaws T T' and held while a section of the wrapping-paper is fed thereunder and severed from the roll of paper. Fig. 10 illustrates the manner in which the plunger C forces a caramel into a peripheral receptacle provided therefor, thereby depressing the ejector-plate until the lateral projection $h^2$ is engaged by the latch $h^3$. Alternating with the caramel receptacles or recesses are V-shaped recesses $k$, within which swing the upper ends or arms $k'$ of the rock-levers $F^6$, which upper ends $k'$ have slots for receiving the downturned rear ends $k^2$ of the folder-plates $F^5$. The construction of these rock-levers is illustrated in Fig. 26, showing a shaft $k^3$, carrying the arm $k'$, and an arm $k^4$, having a laterally-projecting end $k^5$. Fig. 2 shows one of the brackets $F^2$ supplied with a lug $l$, which serves to engage the projecting ends $k^5$ of the rock-levers, thereby moving the folder-plates $F^5$ forward. The movement of each rock-lever occurs just after said rock-lever passes beneath the plunger C, the relative positions of said rock-levers and their actuating-lugs being illustrated by means of dotted lines in Fig. 10.

The caramels are designated by $m$, and in Fig. 10 the succession in which the folds occur is illustrated, and the peripheral pockets are shown carrying caramels from the point where they are received from the plunger to the point of discharge. As illustrated in Fig. 11, the presser-plate G is normally held close to the periphery of the wheel, and as the caramels pass beneath the same the folding of the advance margin of the paper over the top of the caramel is effected. Prior thereto or partially simultaneously therewith the peripheral folder-plate is retracted by being engaged by the point K. (Shown in Fig. 6.) After the retraction of the folder-plate the cam $G^2$ forces the local presser-plate firmly against the caramel and holds the same while the folding of the lateral projecting portions of the paper is effected. The cams which operate the folders H, I, and J advance said folders practically simultaneously to the position shown in Fig. 21, whereby the folder I, which is bifurcated, effects one folding at each lateral end of the caramel. The folder J comprises two swinging blades $n$ $n'$, pivoted at points $n^2$ to the blades of the folder I and connected with links $N^3$ to the stem J', and the folder H comprises blades $p$ $p'$, pivoted at points $p^2$ to the blades of the folder I and joined by links $p^3$ to the head of the stem H'. While the folder I is retained in practically the position shown in Fig. 21, the stem J' is further advanced, thereby swinging the blades $n$ $n'$ to make the foldings illustrated in Fig. 37, and immediately thereafter the stem H' is further advanced to make the foldings illustrated in Fig. 38. During the final advance of the stem H' the stem J' begins to recede, thereby making way for the blades $p$ $p'$. Before the final movement of the folder H is accomplished the folder I starts to recede, and practically simultaneously therewith the stems H' J' recede to the position shown in Fig. 24. Before the completion of the operation just described the folder-rollers M are swung into the position shown in Fig. 25, and said rollers follow the folder-plates as the latter are retracted, thereby effecting the final foldings of the paper. At this instant the cam $G^2$ releases its pressure on the stem G', whereby the presser-plate G is sufficiently retracted to leave the stock-wheel free to revolve. Prior to the folding operations just described the stock-wheel is locked in proper position by means of the plunger R entering one of the series of depressions $q$ with which the wheel is in Fig. 6 shown provided. As each wrapped caramel passes above the printing device the latter is actuated to impress upon the caramel any desired characters.

It is desirable to have the caramel-receiving recesses of the stock-wheel automatically adjustable in size. For this purpose spring-held plates $r$, Figs. 11 and 27, having stems $r'$, are provided. These plates are provided with slots $r^2$, having inclined surfaces, and the ejector-plates $F^4$ are provided with lugs $r^3$, having inclined surfaces $r^4$, adapted to engage the inclined surfaces of the recesses $r^2$ and retract the plates $r$ as the ejector-plates assume their normally elevated position under the force of their springs. During the passage of the caramel from the printing device P to the discharge-chute V the ejector-plate is released by means of a lug $s$, Figs. 2 and 5, which projects from one of the bearings $F^2$. This lug $s$ is in the path of the inner ends of the latches or dogs and serves to throw said pawls out of engagement with the ends $h^2$, as is most clearly shown in Fig. 5.

It is noteworthy that the folder I moves toward the center of the stock-wheel in performing its function, and from Fig. 25 it will be understood that the rollers M move away from the center of the stock-wheel in performing their function. In causing the rollers to pass from the position in dotted lines to the position in full lines in Fig. 25 it is necessary that they be first moved laterally away from the sides of the stock-wheel, then swung inwardly toward the axis of the stock-wheel, and then allowed to come up against the lateral surface of the stock-wheel to the position shown in full lines in the figure referred to. This is necessary in order to prevent the rollers from crumpling the paper of the succeeding caramel. To accomplish this, the lever $M^3$ is first swung in a horizontal plane by means of the cam-surface $t$, Fig. 13, after which the cam-surface $t'$ engages the downturned portion $t^2$ of the lever and forces the lever bodily toward the rear end of the machine, this movement being permitted by providing slots $t^3$ at the connection with the screws $b^3$, as shown in Fig. 3. In other words, the cams are of such a nature as to first swing the levers $M^3$ in a horizontal plane, thereby sheathing the stems $M'$ in their sockets, and then to cause said levers to be moved bodily toward the rear end of the machine, after which the stems $M'$ are again free to be extended by their springs to cause the rollers to engage the lateral surfaces of the stock-wheel. The next movement is to draw the levers $M^3$ toward the front end of the machine, thereby effecting the final foldings of the paper. This is done by the cam-surface $t'$ engaging the downturned end $t^3$ of the lever.

The printing device P is of a well-known form, being provided with a reversible head $w$, which bears normally against an ink-pad $w'$, said head having slots $w^2$ $w^3$, which engage pins $w^4$ $w^5$ for effecting the reversal. The operating-links $w^6$ are connected with said head by means of pins $w^7$, which move in slots $w^8$ and at their lower ends are firmly connected with a head $w^9$, Fig. 2, having a stem $w^{10}$ connected with the lever $P'$.

Fig. 1 shows the shaft of the paper-roll provided with a spring $x$, held in place by a nut $x'$, through the medium of which tension is applied to the roll to prevent it from turning too readily. The opposite end of the shaft has a collar $x^2$, as shown. Fig. 2 represents a spring-held friction-wheel $y$, which engages one of the feed-rollers to prevent the feed-rollers from moving except under the action of the device illustrated in Fig. 8. By preference the feed-rollers contact only at their central portions, as shown in Fig. 5, and are provided with collars $y'$, of rubber or other suitable friction material.

The operation may be briefly recapitulated as follows: The caramels are fed into the chute $B'$ by an operator, one of the caramels occupying the space between the jaws T T', a stop $z$ being provided, as shown in Fig. 1, for limiting the movement of caramels through the chute $B'$. Power is applied to the machine through the medium of suitable pulleys upon the shaft L, and from this source all the moving parts of the machine are actuated. The feed-wheels $D'$ advance the paper till the required amount thereof projects beyond the knife E, as shown in Fig. 4, whereupon the knife descends and severs the paper. The stock-wheel is given an intermittent movement by means of the ratchet-wheel Q and is locked in position. While one caramel is being depressed into the peripheral receptacle of the wheel at one point another caramel is receiving the action of the local folders at another point and another caramel is being printed upon at another point. In Fig. 4 the jaws T T' are shown provided on their inner surfaces with lugs $z'$, which are engaged by the plunger C in its downward movement, thereby separating the jaws and allowing the caramel to fall on the paper. Further downward movement of the plunger presses the caramel into the receptacle which chances to be beneath it, thereby retracting the ejector beneath the caramel, the same becoming locked by the coacting spring-held pawl. The downward movement of the ejector permits the spring-held side plate of the caramel-receptacle under consideration to move inwardly and clamp the caramel against the other side of the receptacle. The plunger C is now retracted and the wheel is unlocked and advanced until another caramel-receptacle comes beneath the plunger. During this advance the projecting end $k^5$ of the rock-lever connected with the peripheral folder-plate of the charged receptacle is engaged by the lug $l$, (shown in Fig. 2,) thereby advancing the folder-plate. In pressing the caramel into its receptacle the plunger effects two folds of the paper. In this forward movement the folder-plate makes another fold of the paper. In due course the charged receptacle passes beneath the presser-plate G, whereby another fold of the paper is effected. At the proper instant the point K engages the recess $z^2$, with which the folder-plate is provided, and retracts the folder-plate, leaving the presser-plate G free to bear upon the caramel. At this stage the caramel is wrapped, as shown in Fig. 35, the lateral margins of the paper projecting laterally from the lateral surfaces of the stock-wheel. At this instant also the stock-wheel is again locked and the folders H, I, and J are advanced in their proper order to effect the foldings illustrated in Figs. 36, 37, and 38, as already described, and immediately thereafter the rollers M are actuated to effect the final foldings, as already described. From the point where the presser-plate G is located the caramel, now completely wrapped, is carried by successive steps till the printing device P is reached. During the operation upon one caramel at the presser-plate G and the feeding of another caramel into the appropriate receptacle beneath the plunger the printing device P is operated to print upon the caramel which is beneath it. After the caramel is printed upon further rotation of the stock-wheel brings the pawl which has held the ejector-plate depressed into contact with the lug $s$, (shown in Fig. 5,) thereby releasing the ejector, whose spring is of sufficient strength to force the ejector outwardly, release the hold of the plate $r$ upon the caramel, and deliver the caramel to the discharge-chute V.

From the foregoing description it will appear that the gist of my invention lies in providing stock-receptacles which are moved in an endless path, means for delivering the stock to said receptacles, thereby effecting two folds of the paper, and local folding means for accomplishing additional folding of the paper. Preferably folder-plates are carried by the stock-wheel or its equivalent for effecting one fold of the paper, and a local presser-plate effects another fold of the paper.

The machine may be modified variously in details of construction. Hence no limitation is to be understood from the foregoing detailed description, except as shall appear from the appended claims.

It is assumed that the machine is capable of use for wrapping other articles than caramels.

What I claim as new, and desire to secure by Letters Patent, is—

1. In a machine of the character described, the combination of receptacles carried in an endless path, means for depressing caramels into said receptacles, thereby effecting two folds of the paper upon which the caramel is placed, folder-plates carried with said receptacles and having a movement independent thereof and serving to make a top fold of the paper, a local folder serving to make the remaining top fold of the paper, stationary folder-guides, and local folding means carried by said guides comprising a group of folders consisting of folders serving to press the top portions of the lateral projections of the paper toward the bottom of the receptacle, folders serving to press the advance portions of the lateral projections of the paper toward the rear of the receptacle, folders serving to press the rear portions of the lateral projection of the paper toward the advance side of the receptacle, and independent final folders serving to press the remaining portions of the projections of the paper toward the top of the receptacle, substantially as described.

2. In a machine of the character described, the combination of an intermittently-actuated stock-wheel having peripheral receptacles, means for locking said stock-wheel at intervals, a plunger serving to depress the stock into the individual receptacles and to make two folds of the paper, tangential folder-plates moving across the tops of said receptacles toward the advance side thereof and serving during said movement to effect one top fold of the paper, a local presser-plate beneath which the receptacles pass and which serves to effect the remaining top fold of the paper, means for advancing said presser-plate to cause the same to bear firmly upon the stock during the interval of retardation of the stock-wheel, and a local group of folders for effecting a folding of the lateral projections of the paper during said interval of retardation, substantially as described.

3. In a device of the character described, the combination of a stock-wheel having individual peripheral receptacles, spring-actuated ejectors in said receptacles, a plunger for depressing the pieces of stock into the receptacles at a given point, thereby effecting two folds of the paper upon which the stock is placed, means for locking the ejectors in a depressed position, local means for effecting folds of the paper, and means for freeing said ejectors to permit them to discharge the receptacle contents after folding is completed, substantially as described.

4. In a machine of the character described, the combination of a stock-wheel having peripheral receptacles, spring-held side plates for said receptacles, spring-held ejectors engaging said side plates, a plunger for depressing stock into said receptacles and through the medium thereof depressing the ejectors, means for locking the ejectors in a depressed position, local means for effecting foldings of the paper, and means for freeing said ejectors to permit them to discharge the contents of the receptacles, substantially as described.

5. In a machine of the character described, the combination of a stock-wheel having peripheral receptacles, a plunger, peripheral folder-plates, rock-levers for actuating said folder-plates in one direction, stationary means for engaging and turning said rock-levers, a local device adjacent to the periphery of the stock-wheel for engaging and retracting said folder-plates, a local presser-plate for effecting one top fold of the paper, and local means for effecting a folding of the lateral projections of the paper, substantially as described.

6. In a machine of the character described, the combination of a stock-wheel having peripheral receptacles, peripheral folder-plates having a movement independent of the movement of the receptacles, spring-actuated ejectors within said receptacles, a plunger, means for holding the ejector depressed during a portion of the movement of the wheel, a local folding device for effecting one of the top folds of the paper as a receptacle and its contained stock passes beneath it, means for producing the required folds at the lateral projections of the paper, and means for freeing the ejectors to permit them to discharge the receptacle contents, substantially as described.

7. In a machine of the character described, the combination of a stock-wheel having peripheral receptacles, means for depressing the stock into the receptacles, thereby making two folds of the paper, a reciprocating radially-moving local folder I for folding the top portions of the lateral projections of the paper, a stationary guide for said folder I, folders connected with the folder I to move therewith and having a movement independent thereof and serving to effect a folding of the advance and rear portions of the lateral projections of the paper, and folders for effecting a folding of the lower portions of the lateral projections of the paper, substantially as described.

8. In a machine of the character described, the combination of a stock-wheel having peripheral receptacles, means for depressing stock into said receptacles, thereby effecting two folds of the paper, means for making the top folds of the paper, a local reciprocating folder having blades for folding the upper portions of the lateral projections of the paper, blades pivotally connected with the blades of said reciprocating folder, actuating means for said pivoted blades, having movement independent of the movement of said reciprocating folder, and means for folding the lower portions of the lateral projections of the paper, substantially as described.

9. In a machine of the character described, the combination of a stock-wheel having peripheral receptacles, means for depressing stock into said receptacles, thereby effecting two folds of the paper, a local reciprocating folder having blades for folding the upper portions of the lateral projections of the paper and provided with an actuating-stem, a cam engaging said actuating-stem, blades pivotally connected with the blades of said reciprocating folder and serving to fold the front and rear portions of the lateral projections of the paper, stems connected with said pivoted blades, cams engaging said last-named stems, and means for effecting the final foldings of the paper, substantially as described.

10. In a machine of the character described, the combination of a stock-wheel having peripheral receptacles, means for delivering stock to said receptacles and wrapping paper about the lower, advance, rear and top sides of the stock, a local radially-moving reciprocating folder having blades for folding the upper portions of the lateral projections of the paper and provided with an actuating-stem, blades pivotally connected with the blades of said reciprocating folder and serving to fold the front and rear portions of the lateral projections of the paper, links pivotally connected with said pivoted blades, stems pivotally connected with said links, cams engaging said last-named stems, and means for effecting the final folds of the paper, substantially as and for the purpose set forth.

11. In a machine of the character described, the combination of a stock-wheel having peripheral receptacles, a plunger serving to depress stock into said receptacles and produce two folds of the paper, means for producing the top folds of the paper, means for folding the upper portions, the advance portions and the rear portions of the lateral projections of the paper, arms pivotally connected to a stationary part of the machine, folder-rollers journaled in stems, having a longitudinal movement with relation to said arms, and a suitably-actuated link, serving to produce a swinging movement of said arms to cause the folder-rollers to engage the paper, substantially as described.

12. In a machine of the character described, the combination of a stock-wheel having peripheral receptacles, a plunger serving to depress stock into said receptacles and produce two folds of the paper, means for producing the top folds of the paper, means for folding the upper portions, the advance portions and the rear portions of the lateral projections of the paper, arms pivotally connected to a stationary part of the machine, folder-rollers journaled in stems, having a longitudinal movement with relation to said arms, and actuating-links connected with said stems and having both a pivotal and a longitudinal movement, said pivotal movement serving to move the stems longitudinally with relation to their arms and said longitudinal movement serving to swing said arms, substantially as described.

13. In a machine of the character described, the combination of a stock-wheel having peripheral receptacles, a plunger, serving to depress stock into said receptacles and produce two folds of the paper, means for producing the top folds of the paper, means for folding the outer portions, the advance portions and the rear portions of the lateral projections of the paper, arms pivotally connected with a stationary part of the machine, folder-rollers journaled in stems yieldingly connected with said arms and having a movement longitudinally thereof, links pivotally connected with said stems and having pin-and-slot connection with a stationary part of the machine, and cams serving to swing said links and to impart a longitudinal movement thereto, thereby to extend and retract said stems and impart a swinging movement to said pivoted arms, substantially as described.

14. In a machine of the character described, the combination of a stock-wheel having peripheral receptacles, a plunger, serving to depress stock into said receptacles and produce two folds of the paper, means for producing the top folds of the paper, means for folding the outer portions, the advance portions and the rear portions of the lateral projections of the paper, arms pivotally connected with a stationary part of the machine, folder-rollers M, stems M' in which said rollers are journaled, pivoted arms M² with which said stems have telescopic connection, springs confined between said stems and said arms, actuating-levers M³ provided with slots, pivotal connection between said levers and stationary parts of the machine at said slots, and cams $t$, $t'$ serving to actuate said levers, imparting both a pivotal and a longitudinal movement thereto, substantially as and for the purpose set forth.

15. In a machine of the character described, the combination of a stock-wheel having peripheral receptacles, ejectors in said receptacles, a feed-chute for stock, lying in substantially the plane of the stock-wheel, a paper-feed device for delivering a strip of paper transversely of the stock-wheel and beneath said feed-chute, means for severing the paper, a plunger for depressing the stock into said receptacles, thereby effecting two folds of the paper, means for securing said ejectors in a retracted position, means for intermittently actuating the stock-wheel and securing it during periods of non-rotation, a peripheral folder-plate carried with each receptacle and having a movement independent thereof and serving to effect the rear top fold of the paper, a local presser-plate beneath which the stock is carried and which serves to effect the advance top fold of the paper, local folder-plates which serve to fold the top, rear and advance portions of the lateral projections of the paper, folder-rollers which serve to fold the lower portions of the lateral projections of the paper, and means for releasing said ejectors to permit them to discharge the contents of the receptacles, substantially as described.

16. In a machine of the character described, the combination of a stock-wheel having peripheral receptacles, means for imparting intermittent movement to said stock-wheel, a feed-chute located in substantially the same plane as said stock-wheel, spring-held jaws carried by the frame receiving the stock from said feed-chute, a plunger, means for releasing said jaws to permit the plunger to depress the stock into the receptacles, and means for completing the operations upon the stock, substantially as and for the purpose set forth.

17. In a machine of the character described, the combination of paper-feed wheels D', a reciprocating knife E, a feed-chute B', jaws T, T' at an extremity of said feed-chute and provided on the inner faces with lugs, a plunger C serving to retract said jaws and depress the stock, a stock-wheel having receptacles for receiving the stock, and means for completing the operations upon the stock, substantially as and for the purpose set forth.

18. In a machine of the character described, the combination with a stock-wheel having peripheral receptacles, means for intermittently actuating the stock-wheel, means for producing the desired folding operations of the paper, means for severing the paper preparatory to wrapping, feed-wheels D' located to feed paper transversely of the stock-wheel, and means for actuating said feed-wheels comprising a ratchet-wheel, a movable pivoted pawl, a strap for moving said pawl, a lever connected with said strap, and a cam for actuating said lever, substantially as described.

19. In a machine of the character described, the combination of an intermittently-actuated vertically-disposed stock-wheel having lateral recesses, a plunger for delivering stock to said wheel, mechanism for folding the wrapping paper, and a locking device for said wheel comprising a plunger R for engaging said recesses in the lateral surfaces of the wheel, a lever R' connected with said plunger R, and a cam for actuating said lever, substantially as described.

20. In a machine of the character described, the combination of a stock-wheel, means for intermittently actuating the stock-wheel, means for locking the stock-wheel while at rest and releasing the same to permit intermittent partial rotation, means for delivering stock to the receptacles with which said wheel is provided, thereby effecting two folds of the paper, wheel-carried folders for making the rear top fold of the paper, a local presser-plate located at the periphery of said wheel, and which serves to make the advance top fold of the paper, means for causing said presser-plate to bear firmly upon the stock which chances to be beneath it when the wheel is stopped, local folders for folding the lateral projections of the paper during a period while the wheel is at rest, means for relieving the pressure of said local presser-plate to permit the stock-wheel to advance, and ejectors for the several receptacles, substantially as and for the purpose set forth.

21. In a machine of the character described, a folder I having blades for producing folds of the top portions of the lateral projections of the paper and provided with a stem, a shaft, a cam on said shaft for actuating said stem, and folders H and J having blades pivotally connected with the blade of the folder I, stems linked to the blades of the folders H and J, cams on said shaft for actuating said last-named stems, rollers M coacting with the folder-blades enumerated and serving to produce the final folds of the paper, actuating means for said rollers, and cams on said shaft engaging the actuating means of said rollers, substantially as and for the purpose set forth.

22. In a machine of the character described, a stock-wheel F having peripheral receptacles, ejector-plates in said receptacles provided with stems extending through radial perforations in said wheel and having their inner ends bent to project to a lateral surface of the wheel, spring-held latches for engaging said lateral projections of said stems, and springs for holding the ejectors normally extended, substantially as described.

23. In a machine of the character described, a stock-wheel having peripheral receptacles, and a local presser-plate G, having spring connection with a stem G', a stem G', and a cam for actuating said stem, substantially as described.

24. In a machine of the character described, a stock-wheel, peripheral folder-plates on said stock-wheel, means for advancing said folder-plates, and a cam-actuated folder-plate retractor K exterior to the periphery of the stock-wheel and engaging the folder-plate, substantially as described.

25. In a machine of the character described, an intermittently-actuated stock-wheel, means located at a given point for delivering stock to said wheel, receptacles carried by said wheel, spring-actuated ejectors within said receptacles, means for holding said ejectors retracted, means for releasing said ejectors, and a discharge-chute V for receiving the ejected stock, substantially as described.

SIMEON J. HICKS.

In presence of—
D. W. LEE,
ALBERT D. BACCI.